United States Patent [19]

Burg

[11] Patent Number: 4,735,164
[45] Date of Patent: Apr. 5, 1988

[54] RAPID ATTACHMENT BOAT DOCKING SYSTEM

[76] Inventor: Donald E. Burg, 15840 SW. 84th Ave., Miami, Fla. 33157

[21] Appl. No.: 844,529

[22] Filed: Mar. 27, 1986

Related U.S. Application Data

[63] Continuation-in-part of Ser. No. 737,403, Nov. 1, 1976, abandoned, and a continuation-in-part of Ser. No. 818,303, Jul. 25, 1977, Pat. No. 4,165,703, and a continuation-in-part of Ser. No. 69,771, Aug. 27, 1979, abandoned, and a continuation-in-part of Ser. No. 207,789, Nov. 17, 1980, abandoned, and a continuation-in-part of Ser. No. 269,908, Jun. 3, 1981, Pat. No. 4,392,445, and a continuation-in-part of Ser. No. 289,769, Aug. 3, 1981, abandoned, and a continuation-in-part of Ser. No. 343,287, Jan. 27, 1982, abandoned, and a continuation-in-part of Ser. No. 458,738, Jan. 17, 1983, abandoned, and a continuation-in-part of Ser. No. 465,670, Feb. 10, 1983, abandoned, and a continuation-in-part of PCT US583/01067, Jul. 11, 1983, published as WO85/00332, Jan. 31, 1985, and a continuation-in-part of Ser. No. 584,728, Nov. 29, 1984, Pat. No. 4,587,918.

[51] Int. Cl.$^4$ .............................................. B63B 21/00
[52] U.S. Cl. .................................... 114/67 A; 114/263
[58] Field of Search ...................... 114/67 A, 230, 258, 114/259, 263, 273, 262; 405/1, 219, 221; 104/134, 135, 138 R

[56] References Cited

U.S. PATENT DOCUMENTS

| | | | |
|---|---|---|---|
| 2,501,310 | 3/1950 | Burbe | 114/262 |
| 2,511,979 | 6/1950 | Goddard | 104/134 X |
| 3,139,059 | 6/1964 | Hanford, Jr. | 114/273 |
| 3,403,652 | 10/1968 | Hardy | 114/259 |
| 3,473,483 | 10/1969 | York | 104/135 X |
| 3,820,490 | 6/1974 | Greer | 114/258 X |
| 3,990,258 | 11/1976 | Ford | 405/1 |
| 4,070,980 | 1/1978 | Shorter, Jr. | 114/263 |

Primary Examiner—Sherman D. Basinger
Attorney, Agent, or Firm—Robert J. Van Der Wall

[57] ABSTRACT

A rapid boat docking and efficient loading/unloading apparatus is provided that utilizes an attachment system. The attachment system also serves as a gangplank in the preferred embodiment to attach the boat to the dock. The principal forces required to attach the boat to the dock are optionally part of the boat itself in the form of an air lifting system that holds the boat at a level higher than its waterline at rest so long as an air blower is in operation that supplies pressurized air to a chamber or recess on the underside of the boat. As blower power is reduced, the boat settles into its docking slip with the attachment system. The attachment system is located preferably at the bow on each side of the boat, and comes into contact with the dock as the boat lowers. In the preferred embodiment, attachment arms which are part of the boat have a half cylindrical track on their underside which fit into a mating socket track on the dock. Optional approaches utilize movable attachment arms that give even greater flexibility for rough sea docking requirements. The movable attachment arms also permit use of elements of this invention with boats that do not have the air lift capability. The attachment arms would typically also serve as gangplanks. The dock used is preferably of a floating type to compensate for tides and rough seas, and would normally be held in position by pilings that penetrate openings in the dock. The ends of the dock are best shaped to allow maximum entrance width for an incoming vessel.

45 Claims, 4 Drawing Sheets

RAPID ATTACHMENT BOAT DOCKING SYSTEM

CROSS REFERENCE TO OTHER APPLICATIONS

The present invention is a continuation-in-part and is copending with at least some of the inventor's earlier applications to-wit: Ser. No. 737,403, filed Nov. 1, 1976, now abandoned; Ser. No. 818,303, filed July 25, 1977, now U.S. Pat. No. 4,165,703, issued Aug. 28, 1979; Ser. No. 069,771, filed Aug. 27, 1979, now abandoned; Ser. No. 207,789, filed Nov. 17, 1980, now abandoned; Ser. No. 269,908, filed June 3, 1981, now U.S. Pat. No. 4,392,445, issued July 12, 1983; Ser. No. 289,769 filed Aug. 3, 1981, now abandoned; Ser. No. 343,287 filed Jan. 27, 1982, now abandoned; Ser. No. 458,738, filed Jan. 17, 1983, now abandoned; Ser. No. 465,670 filed Feb. 10, 1983, now abandoned; International Application No. PCT/US83/01067, filed July 11, 1983, now WO85/00332; and Ser. No. 584,728, filed Nov. 29, 1984, now U.S. Pat. No. 4,587,918 issued May 13, 1986.

FIELD OF THE INVENTION

This invention primarily relates to the field of boat docks, and, more particularly, to docking systems of boats supported at least in part by a pressurized air cushion located on the underside of the vessel. These vessels, exemplified by Applicant's Air Ride Boat Hull inventions, raise in the water when the air cushion is pressurized. The present invention utilizes that feature in the preferred embodiment of the present invention, although the same is also applicable to conventional boats.

BACKGROUND OF THE INVENTION

Previous docking systems include pier and seawall type docks that require substantial expertise on the part of the helmsman to come alongside in varying current and wind conditions and also normally require tying up dock lines and the like. Usually a gangplank must then be put into place to allow transfer of passengers and cargo between the boat and the dock. There have been some attempts to improve upon this by incorporating a gangplank into the dock design that lowers onto the boat deck after the boat is secure in its moorings. There have also been efforts to incorporate the gangplank into the boat design for lowering onto the dock or shoreline as was done with old riverboat steamers. In any event, skilled helmsmen, dock lines and deckhands, and special gangplanks are normally required.

Prior art docking systems are constrained by conventional boat design which lacked the capability to control raising or lowering of the boat adjacent to the dock. The preferred embodiment of the present invention was made possible by the advent of air lift boat designs, including the Air Ride Boat Hull inventions of Applicant, the Surface Effect Ship (SES), and Hovercraft which raise significantly when their underside air chamber is pressurized with air supplied by an on-board blower.

Following are some prior art references that attempt to resolve at least some of the deficiencies described above. The first of these is a high speed boat docking scheme shown by Greer, U.S. Pat. No. 3,820,490 who teaches a hydrofoil type craft that approaches a fixed position long elevated track at high speed. The high speed is necessary to keep the boat elevated above the tracks. There is an elevated portion of the track where wheels located on the underside of extensions on either side of the craft make contact with the track. It is at that point that craft power is cut and docking can hopefully be accomplished. Undocking is accomplished by accelerating forward down the same track. Greer does not include any means to accomplish docking by simply raising and lower the hydrofoil craft while dockside since his craft cannot do that. Further, Greer's system is rather elaborate and would appear hazardous since precise close quarters navigation at high speeds is required.

Patents related docking schemes for air lift type craft include Ford, U.S. Pat. No. 3,990,258 and Hardy, U.S. Pat. No. 3,403,652. Ford utilizes ramps for launching a Surface Effect Ship (SES) to and from a beach. This ramp may include parallel tracks or a carriage. In either case, once initial contact is made with ramp, a winch is used to haul the boat onto the beach and there is little relationship to the instant invention except that Ford also utilizes an air lift type boat. Hardy shows a hovership docking concept where a fully skirted and hence amphibious hovercraft drives on to a deck of a larger displacement ship. The displacement ship is composed of catamaran hulls joined together by structure that forms a landing bay or deck for the hovercraft. The hovercraft drive up onto the landing bay which is fitted with a holding ramp at its back end to facilitate hovercraft entrance and exit since the landing bay is purposely above the waterline. The hovercraft rests completely above the water when secured. The latter feature is desireable since a major purpose of Hardy's invention is to provide a means to transport fully amphibious hovercraft long distances inside of more or less conventional catamaran like displacement hull forms. Hardy's invention requires a special displacement hull form with an above the waterline landing bay, a fully amphibious hovercraft, and does not have attachment arms for loading or unloading cargo or passengers.

The are also patents that show a ball and socket system. These include York, U.S. Pat. No. 3,473,483, a substantially hemisphere shaped track system; Goddard, U.S. Pat. No. 2,511,979; and even a foldable windged hydrofoil watercraft, Hanford, U.S. Pat. No. 3,139,059. York's ball and socket system, a downwardly sloped track consisting of a curved surface of balls captured in sockets that support a sliding mat in an amusement park ride, is hardly related to the present invention's docking socket attachment system.

Goddard's invention includes gas bearing supported tracks used to support a high speed vacuum tube transportation system. Goddard's gas bearing supported track system reduces friction to an absolute minimum but the track portions must remain in close but non-contacting proximity at all times during high speed operation. Further, Goddard cannot separate his track system by pressurizing an air chamber in the underside of his vehicle since he lacks such structure and a water surface to retain air pressure. Hanford presents a winged hydrofoil watercraft wherein the wings can be folded up and down to gain the maximum benefit from aerodynamic lift, especially in ground effect. Since Handford's wings are not used for docking or attachment there is little relationships to the present invention's movable docking attachment arms.

In its preferred embodiment, the present invention utilizes attachment arms that settle onto the dock as blower power is reduced on air lift vessels. This also secures the boat at the dock, eliminating handling of dock lines. In most applications, the attachment arms also serve as gangplanks. This presents a very low cost and practical approach to a problem which boat owners have come to accept as lacking a solution, because they have learned to live with the prior art cumbersome, time consuming, and hazardous methods of docking.

While the aforementioned air lift boat designs have rigid sidehulls or other rigid structure which normally extend the length of the boat and are water contacting at all times, restricting these vessels to marine service, it should be mentioned that there is another air supported craft to which the present technology can be applied. The pure Ground Effect Machine (GEM) has flexible skirts or seals around its full periphery that actually clear the surface over which it moves, thus making the same truly amphibious. The docking systems used for GEM's are more like those used for seaplanes, since they utilize ramps that slope into the water. The GEM goes up the ramp and then reduces blower power to settle onto a flat landing area. The docking system of the present invention is adaptable for use with GEM's where landing ramps are not available.

The present invention can also be applied in an alternative embodiment to other more conventional marine vessels which lack an air lift system. A U-shaped floating dock and a movable attachment arm in combination with a mating socket track provide advantages for all vessels.

SUMMARY OF THE INVENTION

With the foregoing in mind, it is a principal object of the present invention to provide a rapid attachment docking system which, when used with air lift boats, functions as the boats are lowered when their air lift systems are turned off.

A related object of the invention is to support at least a portion of the weight of the boat and its contents with the dock when the boat is lowered as its air lift system is turned off.

Another principal object of the invention is to provide for automatic securing of a boat into a dock without dock lines, etc.

A collateral object of the invention is to incorporate dock attachment arms as a part of the boat or as a part of the dock.

Another object of the invention is to offer either rigid or movable attachment arms as may be dictated by sea conditions.

One more object of the invention is the capability to use a fixed dock, as opposed to a floating dock, as a consequence of movable attachment arms.

A related principal object of the invention is that attachment arms can also function as gangplanks between the boat and the dock.

One more object of the invention is to provide a locking apparatus between the attachment arms and the dock to secure the boat therein.

A further object of the invention is to secure the boat when docked both in a fore-and-aft direction as well as in a side-to-side direction by locating the locking apparatus at the forward and side portions of the boat.

An object of the perferred embodiment of the locking apparatus is to include male and female half-cylindrical tracks which automatically engage as the boat is lowered.

Another object of the invention is to offer as an option a wheel, skid, or other device at the free end of the attachment arm to allow maximum movement of the boat in rough seas.

An additional object of a movable attachment arm is to equip the same with a hinge design at its pivoted end which is durable and low in cost.

Another object is to offer a variation of the movable attachment arm that includes a resiliently biased loading device to maintain the attachment arm in contact with either the boat or the dock as the arrangement dictates during rough sea operation.

Yet another object of the invention is to provide power actuation to a loading device connected to the movable attachment arm to control loading between the boat and the dock.

A further object of the invention is to provide a low cost floating dock system for economical and simple manufacture at a remote location, to facilitate ease of installation with simple pilings or other locating devices.

One more object of the invention is that its economical design facilitates installation next to seawalls, existing docks, or close to undeveloped beaches to minimize the need for dredging or construction of special harbors or channels A further additional object of the invention is to furnish the foregoing objects and advantages in combination with a dock that minimizes difficult maneuvering of a boat for docking, allowing entrance into the dock and attachment thereto without dock lines, in a matter of seconds.

Yet another object is to offer a docking system which also offers the foregoing objects and advantages with conventional boats that do not have an air lift capability.

Other objects and advantages of the present invention will become apparent to those skilled in the art from the following descriptions and claims, and from the accompanying drawings.

In accordance with the present invention, there is disclosed an improved docking system to be used, in its preferred embodiment, with air lift boats such as the Air Ride Boat Hull, Surface Effect Ships, Hovercraft, Ground Effect Machine, or other such craft. All of the aforementioned craft are capable of raising or lowering at dockside by operation of onboard blower systems. As the craft is lowered, attachment arms fixed either to the craft or to the dock, come in contact with the dock or the craft as the case may be, thus securing the same in its moorings. In the preferred embodiment, the attachment arms also serve as gangplanks for loading and unloading of passengers and cargo.

The dock would normally be U-shaped to conform to the boat deck line or sheer configuration so that no special handling or maneuvering skills would be required of the helmsman. The boat would simply be headed into the open end or the U-shaped dock and powered forward slowly until it nested therein. The blower power would then be reduced or turned off allowing the boat to settle into its moorings. The procedure would be reversed when leaving. Of course, it is possible to utilize the attachment means with air lift boats without a special U-shaped dock if desired.

The dock itself is optionally a floating structure held in position by pilings that penetrate openings in the dock, in straps attached to the dock, or the like. A simple hinged ramp can be used between a floating dock and a seawall, or other dock, etc. It is also possible to use a fixed dock when movable attachment arms are used between the boat and the dock where tides are not a significant factor.

Although the preferred embodiment utilizes attachment means which are a fixed and substantially rigid part of the boat, it is, of course, possible to make the attachment arms part of the dock and/or to make them movable. The latter approach may be desirable for rough sea or other considerations such as are encountered in operations in open seas next to off-shore oil platforms.

The connections between the boat and the dock are constructed in the form of locking apparatus. The locking apparatus is preferably designed as mating male and female half-cylindrical tracks that not only automatically engage to secure the boat, but also can allow movement between the attachment arm and the boat or the dock if the system is designed to permit movement.

Related thereto, in another version of the present invention, the end of the attachment arm is equipped with a sliding or roller device such as a wheel to give additional freedom of movement in rough seas. The latter approach would normally be used in conjunction with a movable attachment arm with the restrained end of the attachment arm preferably connected with a hinged or ball and socket joint.

When a movable attachment arm is utilized, it is preferable to employ a resiliently biased loading device, such as a spring loaded cylinder, to maintain the attachment arm forcefully against the boat or the dock as the case may be. Biasing may also be provided by hydraulic, pneumatic, electric or other means where variable controlled loading between the dock and the boat may be achieved.

While the materials of construction are of course optional, an economical design is obtainable with socket tracks made of extruded metal such as aluminum or stainless steel, or optionally high durometer rubber-type materials can also be used. The structure of the floating docks may be of fiberglass or fiberglass covered closed cell plastic foam. Walkways and ramps are preferably fabricated from aluminum threadplate.

To simplify docking maneuvers, it is preferable to utilize a substantially U-shaped dock. The shape of the U should conform to the shape of the boat, with the opening at the mouth being as wide as possible to facilitate entry. Flexible pads or bumpers are used in the conventional manner on the dock to protect against hull damage. An optional safety and convenience feature is to make a section of the railing on the boat into a hinged gate which acts as a guard when underway.

The invention will be better understood upon reference to the following descriptions and the drawings in which:

DETAILED DESCRIPTION

With reference to each of the aforementioned figures in turn, and using like numerals to designate similar parts throughout the several views, a preferred embodiment and several alternative embodiments will now be described in detail.

Figure 1:
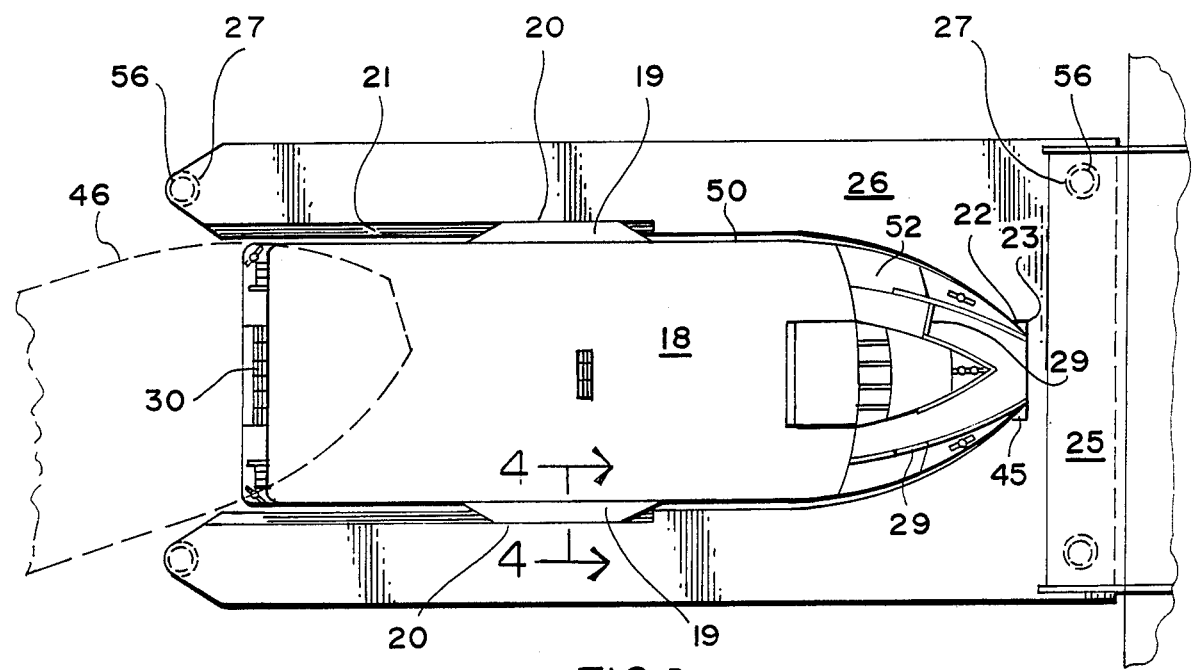
FIG. 1 is a top view of a pressurized air supported boat in docking position in the inventive docking system, showing side and forward attachment arms which also act as gangplanks in the preferred embodiment and their securing tracks on the dock. Also shown in this figure in phantom is the front portion of the boat entering the dock at an angle.

FIG. 1 is a plan view of an air lift boat 18 and dock 26 of the inventive design in docking position. A partial view of the boat 18 is shown entering the dock 26 at an angle by the phantom outline 46. The dock 26 is shown in proximity to a seawall 24, which are connected to each other by a movable hinged ramp 25. Also shown are dock locating pilings 56 which penetrate holes 27 in dock 26. The boat 18 includes side attachments 19 and forward attachment 45. Side attachments 19 and forward attachment 45 also normally serve as gangplanks from boat deck 52. Connected to the boat are boat securing tracks 20 and 22. Dock 26 includes dock securing tracks 21 and 23 which mate with boat securing tracks 20 and 22. The securing tracks are preferably shaped as half cylinders to allow maximum movement. Also illustrated is the boat's main deck line or shear 50. The blower inlet 30 can be seen at the aft and hinged gates 29 near the bow are shown open on the starboard side and closed on the port side.

Figure 2:
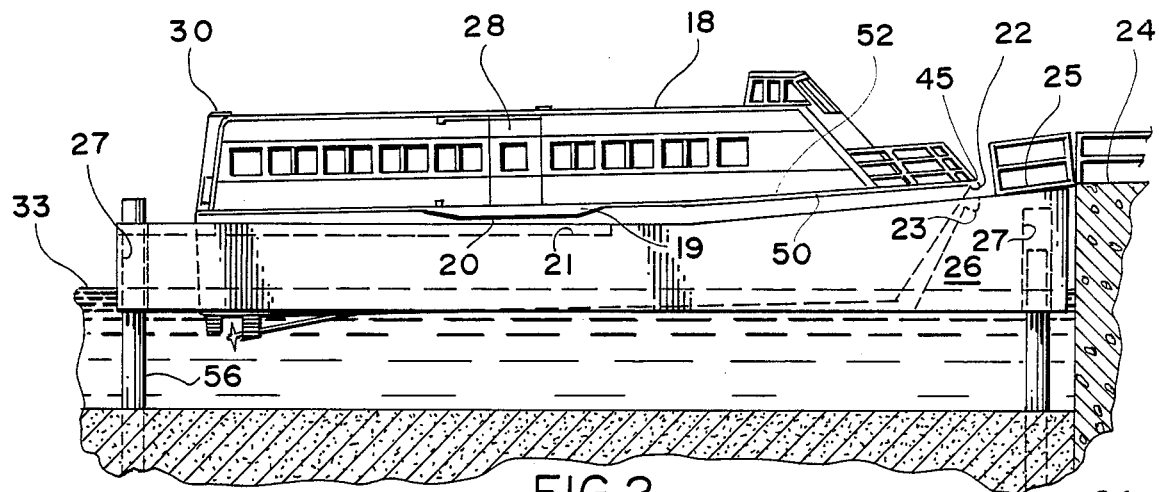
FIG. 2 is a side elevation view of the boat in docking position with the boat still elevated by its air cushion so that the docking attachment arms are above the dock, and thus not secured.

FIG. 2 presents a side elevation view illustrating the boat 18 elevated to its normal running height because its blower is turned on and its air cushion is accordingly pressurized. This elevation maintains the boat securing tracks 20 and 22 free of the dock securing tracks 21 and 23. Forward attachment arm or gangplank 45 and side attachment arm or gangplank 19 are also shown. Also illustrated are waterline 33, boat shear 50, boat deck 52, pilings 56, dock holes 27 which pilings 56 penetrate, seawall 24, seawall ramp 25, blower air inlet 30 and a boat side door 28 in its closed position.

Figure 3:
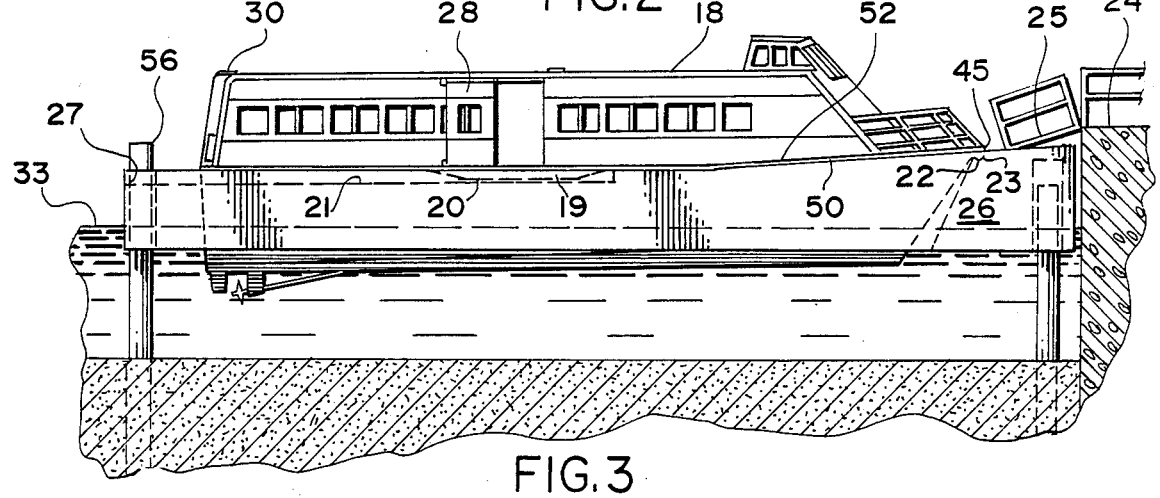
FIG. 3 is a similar side elevation view of the boat in docking position with the boat lowered because the air cushion has been turned off. With the boat lowered, it is secured to the dock with the attachment arms.

FIG. 3 is a similar side elevation view of the boat 18 except that the boat 18 is lowered because the blower is turned off and, therefore, the boat air cushion is depressurized. Thus, the boat securing tracks 20 and 22 are in contact and mate with dock securing tracks 21 and 23 so that boat 18 is connected to its dock 26. Boat securing tracks 20 and 22 are located on the underside of the attachment arms 19 and 45 where these arms also serve as gangplanks in this embodiment. In a manner similar to that in FIG. 2, there is also illustrated waterline 33, boat shear 50, boat deck 52, pilings 56, dock holes 27, seawall 24, and blower air inlet 30. Boat side door 28 is shown in open position for loading and unloading. It will also be seen that seawall ramp 25 is at a slightly increased angle from that in which it was illustrated in FIG. 2. This is because a portion of boat weight 18 is borne by the floating dock 26 as a consequence of the air cushion having been depressurized when the blower is turned off. This depresses slightly the dock 26 resulting in the increase in the angle of the seawall ramp 25.

Figure 4:
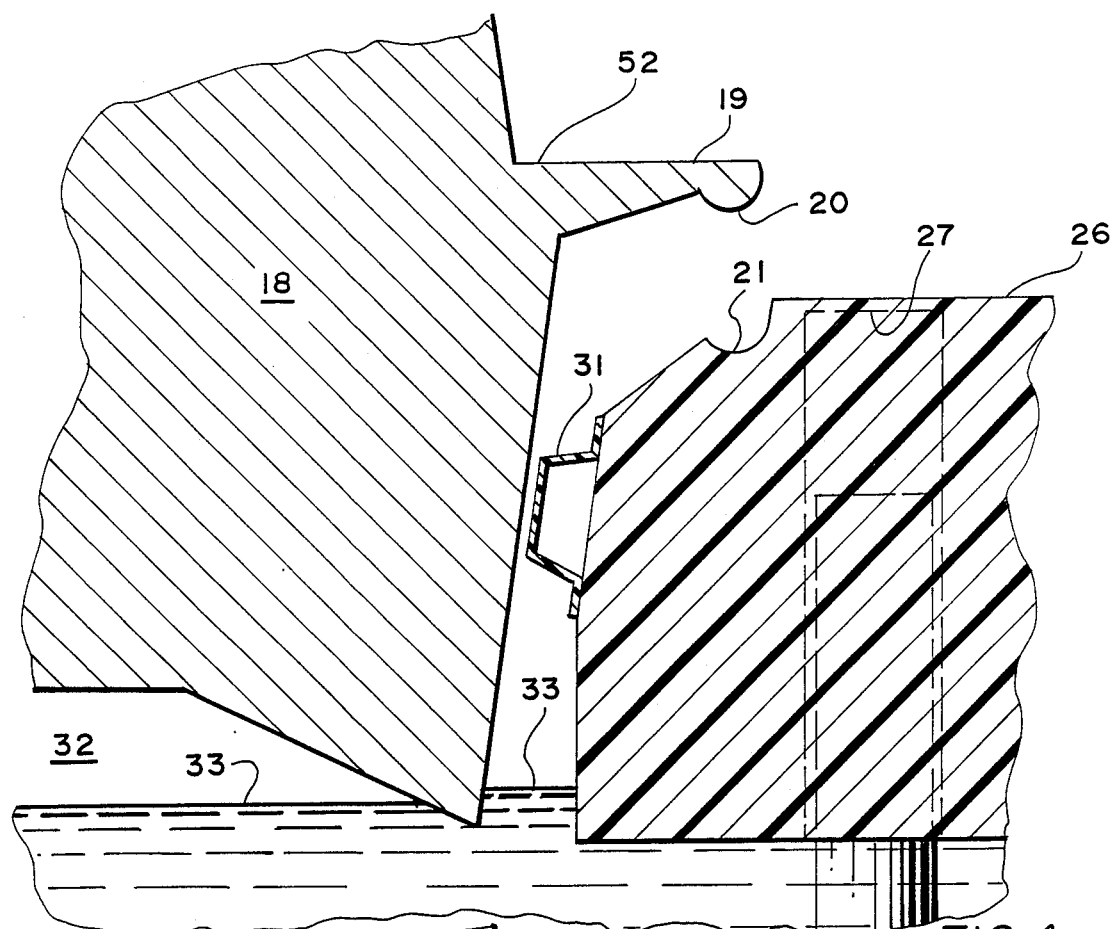
FIG. 4 is a partial transverse cross-sectional view of the boat and dock in which the boat is shown elevated with its air cushion pressurized, and the floating dock is shown at its normal point of buoyancy without supporting any of the weight of the boat. The cross-sectional view is taken through one of the side attachment arms and shows the half cylindrical tracks on the dock and mating attachment arm prior to coupling.

FIG. 4 is an enlarged partial transverse cross-sectional view taken through a side attachment arm or gangplank 19. The boat 18 is shown elevated as a consequence of its air cushion 32 being pressurized. In this embodiment, the boat securing track 20 is shown in its male embodiment and the dock securing track 21 is shown in its female embodiment. Obviously, the invention contemplates reversal of the male/female positions, and the use of other configurations including, but not limited to a ball and socket arrangement. Also shown is the water surface or waterline 33 in a free state, a dock flexible bumper 31, and the boat deck 52. Regarding the dock, piling 56 is shown disposed within hole 27 of floating dock 26.

Figure 5:
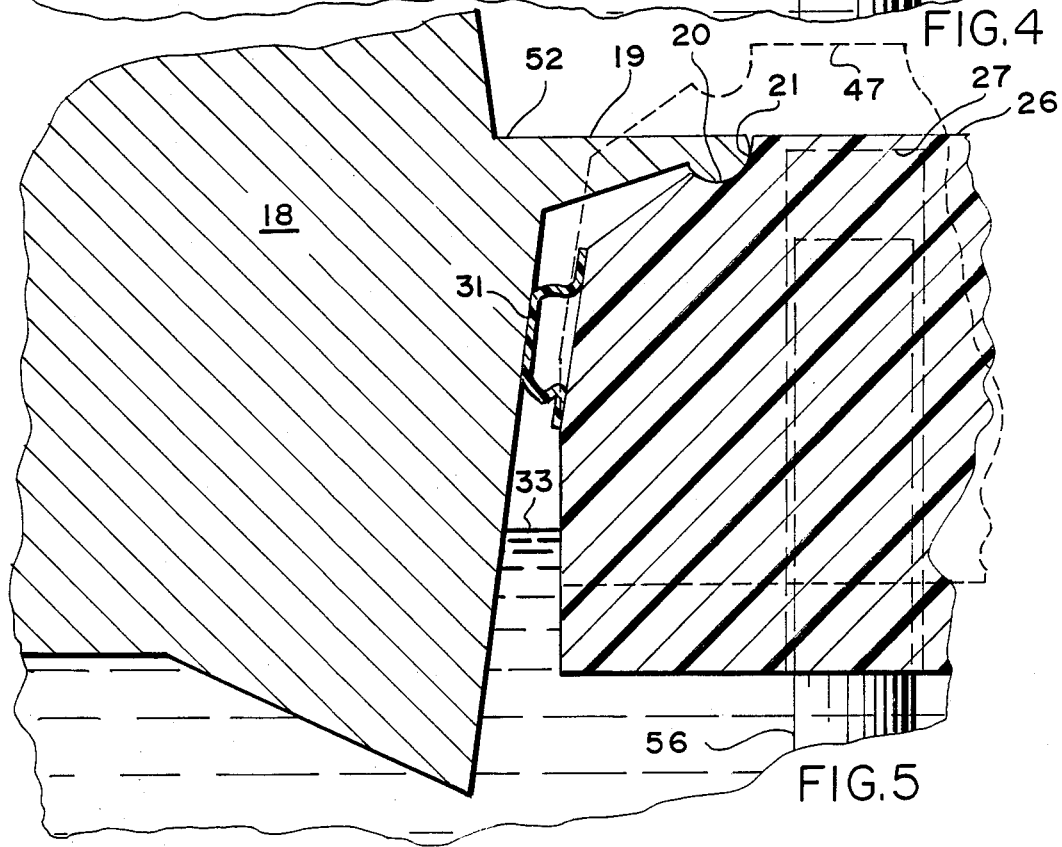
FIG. 5 is a similar partial transverse cross-sectional view of the boat and dock, except that the boat is shown lowered and thus secured to the dock. Also illustrated, is the use of the attachment arm on the boat as a gangplank and the settling of the floating dock as it bears a portion of the weight of the boat with the air cushion turned off.

FIG. 5 is a view similar to FIG. 4, except with the air cushion 32 depressurized. Consequently, it is filled with water resulting in a lowering of the boat 18 and mating of the male boat securing track 20 with the female dock securing track 21. As noted above, some of the boat 18 weight is borne by the dock 26 which results in a change of the waterline 33 on the dock 26 and compression of the flexible bumper 31. The phantom line 47 shows the dock 26 prior to contact of the boat securing track 20 with the dock securing track 21.

Figure 6:
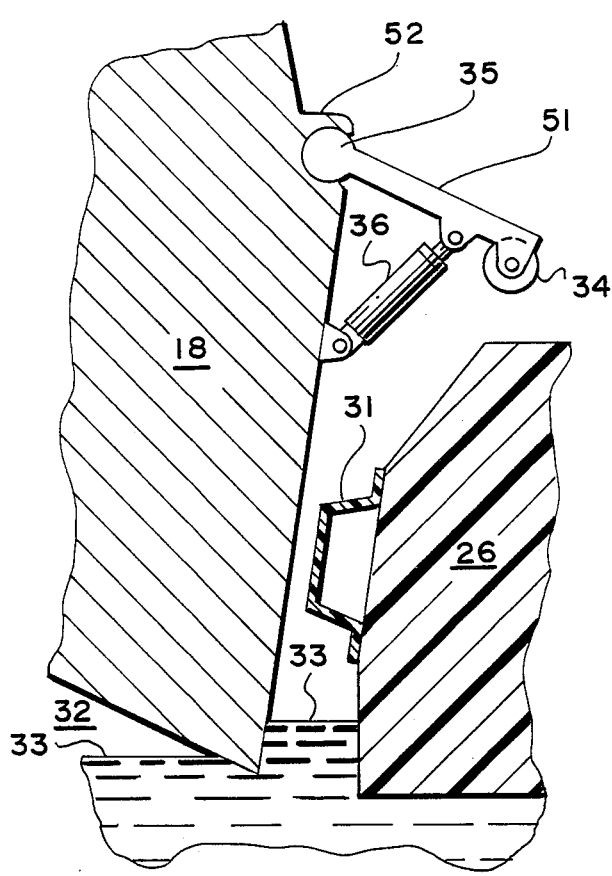
FIG. 6 is a partial transverse cross-sectional view showing an alternative embodiment with an attachment arm or gangplank that has a movable connection with the boat to provide greater flexibility between the boat and dock during rough sea operation.
Figure 7:
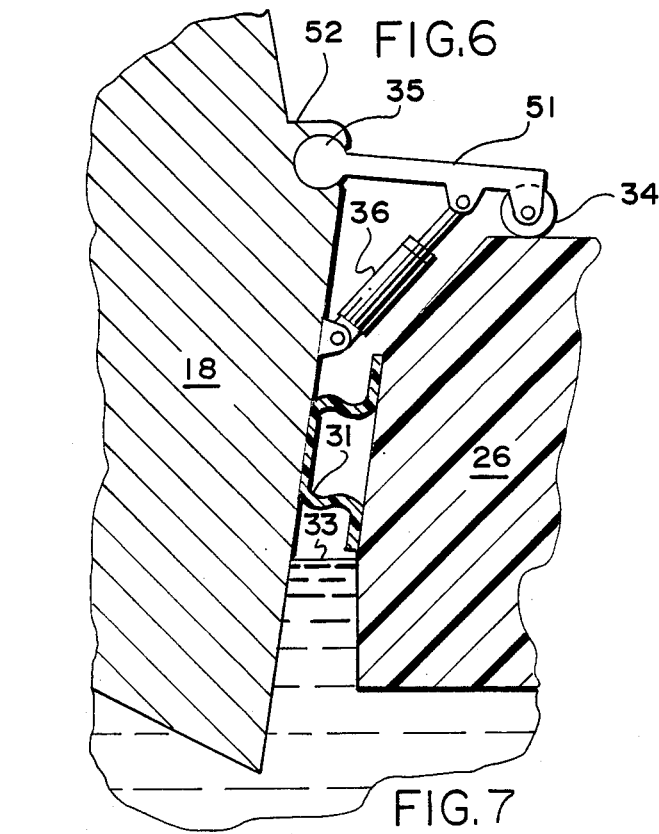
FIG. 7 is a similar partial transverse cross-sectional view showing the same alternative embodiment of FIG. 6, except that the boat is shown lowered with the attachment arm in contact with the dock

FIGS. 6, 7, 9, and 10 are views similar to FIGS. 4 and 5, except illustrating alternative embodiments only with FIGS. 6 and 7 showing the elevated and lowered comparison like that of FIGS. 4 and 5, except using a particular alternative embodiment.

This particular alternative embodiment is characterized by a movable attachment arm 51 which is attached to the boat 26 by a hinge 35 or other type of movable or flexible joint. This movable arm 51, in its preferred configuration, is loaded by a resiliently biased actuator 36. The attachment arm 51 would normally include a wheel 34 to allow movement on the dock 26 although the half cylinder boat securing track 20 and dock securing track 21 shown in FIG. 4 can also be used with a movable arm 51. The actuator 36 can also be loaded by hydraulic or pneumatic means. This approach offers better rough water docking performance than that shown in FIG. 4, since the boat 18 and dock 26 can move relative to each other. Of course a flexible dock bumper 31 is included and waterline or water surface 33 is illustrated. The movable attachment arm 51 allows use of this invention with conventional boats also since they do not have the air lift capability for elevating or lowering of the hull.

FIG. 7 shows the same alternative embodiment with the air cushion depleted which has the effect of lowering the attachment arm 51 and more specifically wheel 34 into contact with dock 26. Optional use of hydraulic or pneumatic forces in the actuator 36 allows variation of the load on the dock 26. Also shown is hinge 35, flexible bumper 31, which is distorted by loading, boat deck 52 and waterline 33.

Figure 8:
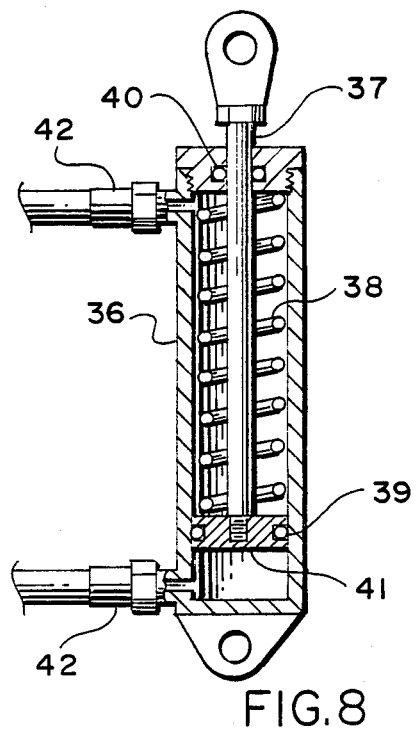
FIG. 8 shows an axial cross-sectional view of an actuator suitable for use with the attachment arms of FIGS. 6 and 7.

FIG. 8 shows a simple, commercially available device, in cross-sectional view, as may be utilized for actuator 36. It includes piston shaft 37 with minimum extension as would be encountered in the configuration shown in FIG. 6. Included in the illustrated actuator are seals 40 and 41, spring 38, piston 41, and optional fluid ports 42. The invention also contemplates the use of resilient systems other than the mechanical spring 38 such as gas springs, and the like.

Figure 9:
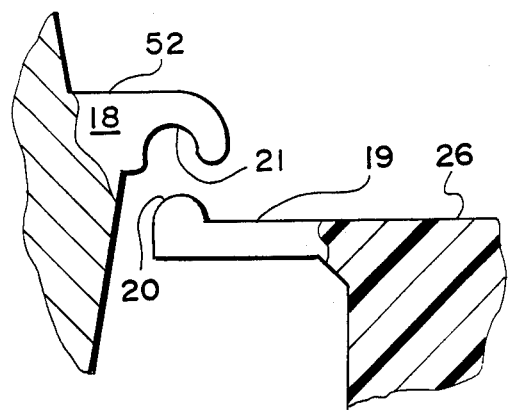
FIG. 9 is a more abbreviated but similar partial transverse cross-sectional view of a further alternative embodiment of the boat and dock with the boat elevated and showing a substantially rigid attachment arm as a portion of the dock.

FIG. 9 shows a further alternative embodiment with a fixed attachment arm 19 as part of the dock 26. This also shows deck 52 on boat 18 and securing tracks 20 and 21 with the male/female configuration reversed from that of the preferred embodiment.

Figure 10:
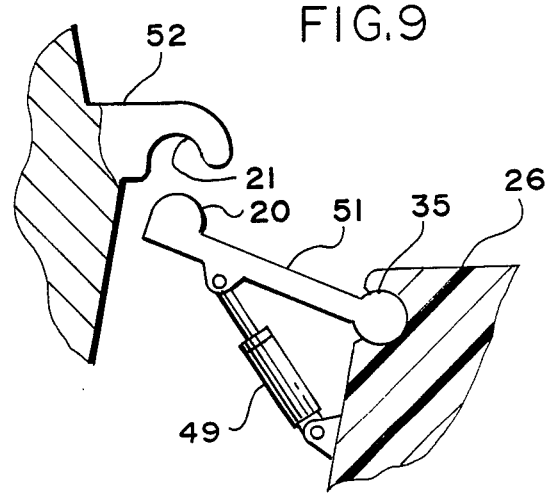
FIG. 10 is a similar abbreviated partial transverse cross-sectional view of one more alternative embodiment of the boat and dock showing the boat elevated and having a movable attachment arm permanently affixed to the dock.

FIG. 10 shows another alternative embodiment with a movable attachment arm 51 attached to the dock 26, as opposed to the boat. It includes a cylindrical track shoulder joint 35 and mating of the boat 18 to the dock 26 is also accomplished with securing tracks 20 and 21. The actuator 49 is similar to actuator 36 of FIG. 8, except that the spring 38 is on the other side of piston 41. Movable arm 51 can also be positioned above the boat deck 52 if desired, with operation of the arm 51 then downward rather than upward as shown. This latter approach may be preferred for use with conventional boats which do not have an air lift capability.

Figure 11:
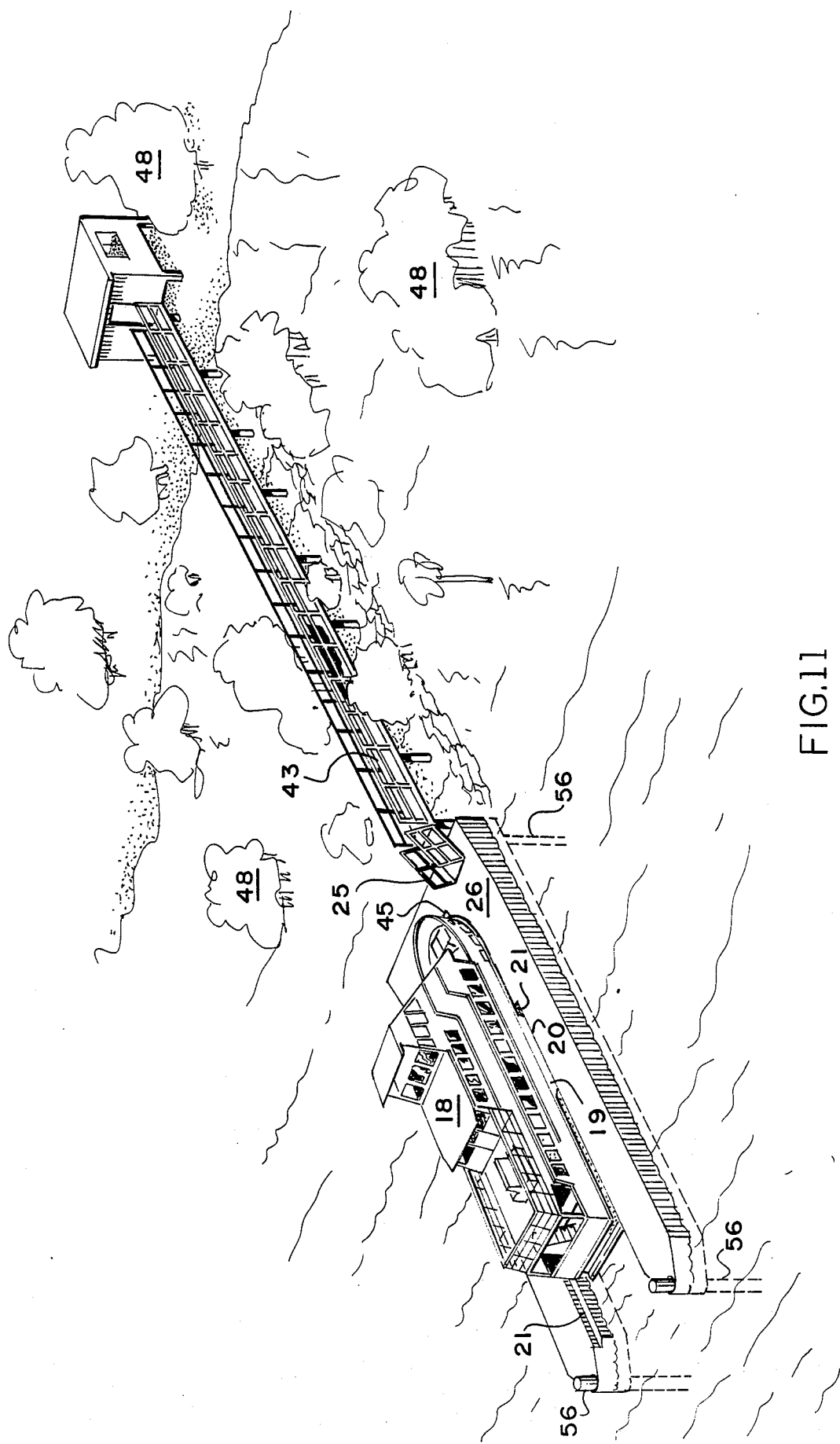
FIG. 11 is a perspective view of the inventive docking system illustrating how the same facilitates minimal environmental impact by remote location from a beach, thus eliminating harbors or channels under appropriate circumstances.

FIG. 11 is a perspective view showing the use of the inventive docking system in one of its preferred applications, where it offers an extremely low cost solution to docking in environmentally sensitive areas. The U-shaped floating dock 26 is shown surrounding boat 18 with boat 18 and dock 26 secured to each other. The environmental advantages are multiple:

1. The nature of the U-shaped floating dock means a minimum construction activity since a relatively few pilings must be sunk into the bottom of the body of water in which the invention is used at an appropriate depth.

2. The location of the floating dock can be determined by the nature of the slope of the bottom of the body of water and therefore no dredging activity is necessary in the event of a gradual sloping in order to increase the depth of water to accomodate the draft of the boats being used.

3. No construction activity is necessary to alter the shoreline configuration, as is usually necessary for the installation of fixed docks or bulkheads against which boats normally tie up.

4. As a consequence of the foregoing point, heavy construction vehicles such as concrete trucks and the like are unnecessary to bring into the shoreline thus eliminating the need for the construction of roads through parks or other environmentally sensitive areas and without the necessity to destroy mangrove swamps or other shoreline flora.

5. The elimination of the need for docklines, gangplank alignment, etc., reduces significantly the amount maneuvering activity of the boat. Accordingly, there is significantly less disruption to the water surrounding the dock because of the almost complete elimination of maneuvering by the vessel, which in turn minimizes the impact to water plants and other forms of water life in the vicinity of the dock, and minimizes bottom erosion.

6. Shore based construction can be accomplished without the use of steel and concrete, if desired, particularly in regard to embedding the same in the ground.

7. Other related environmental and cost advantages will become apparent to those skilled in the areas of environmental preservation and structural engineering.

Referring to the specifics of FIG. 11, the passage of the fixed dock 43 through shoreline habitat such as mangroves 48 has minimal environmental impact. The floating portion of the dock 26 is connected to the fixed dock 43 by ramp 25 thus allowing for tide changes. It is readily seen that the floating dock 26 can be positioned at a point that completely eliminates the need for bottom dredging such as would be necessary to create channels to accomodate the draft of the vessel 18. Also shown are side securing tracks 21 and side and forward attachment arms 19 and 45. In this perspective view it can readily be seen how side attachment arms 19 can travel down dock securing track 21 when the boat 18 is in the elevated position and can then settle down into the track for mating of the boat securing track 20 with dock securing track 21.

Having described the presently preferred embodiments of the invention, it should be understood that various changes in construction and arrangement will be apparent to those skilled in the art and are fully contemplated herein without departing from the true spirit of the invention. Accordingly, there is covered all alternatives, modifications and equivalents as may be included within the spirit and scope of the invention as defined in the appended claims.

What is claimed is:

1. A rapid attachment boat docking system comprisng:
an air lift boat having an air chamber proximal its underside that raises and lowers said boat while dockside with said air chamber at last partially in water contact during all phases of docking, at least one attachment arm that, when connecting the boat and a dock, is disposed proximal a deck level of the boat, and said attachment arm transmitting only a portion of weight of the boat to the dock as pressure in said air chamber is reduced, said attachment arm comprising connecting means including male and female part cylinderical tracks with one portion of said connecting means being attached to the boat and another portion attached to the dock and with track portions coming into contact when pressure in the air chamber is reduced during docking.

2. The docking system of claim 1 wherein the attachment arm is movable with reference to both the boat and the dock while in contact with both the boat and the dock.

3. The docking system of claim 2 wherein the movable attachment are further comprises a resiliently biasing member.

4. The docking system of claim 2 wherein said movable attachment arm further comprises a controllable force loading member.

5. The docking system of claim 1 wherein the attachment arm further comprises connecting means including a ball and a socket with one portion of said connecting means being attached to the boat and another portion attached to the dock and with ball and socket portions coming into contact when pressure in the air chamber is reduced during docking.

6. The docking system of claim 1 wherein the attachment arm permits relative motion between the boat and the dock.

7. The docking system of claim 6 wherein a movable end of said attachment arm is permanently attached by connecting means including part cylindrical male and female portions.

8. The docking system of claim 1 wherein the dock floats and said dock is lowered in the water as the boat lowers in the water.

9. The docking system of claim 8 wherein the floating dock is held in position by dock positioning members that substantially restrict movement of the dock to a vertical direction.

10. The docking system of claim 1 where said attachment arm further comprises a gangplank.

11. The docking system of claim 1 wherein said dock is substantially U-shaped with the U-shape open to the water.

12. The docking system of claim 1 wherein said air lift boat rises as its air chamber is pressurized thereby disconnecting said attachment arm automatically.

13. A rapid attachment boat docking system comprising:
an air lift boat having an air chamber proximal its underside that raises and lowers said boat while dockside of a floating dock, a portion of said floating dock being open to water so that the boat can remain partially waterborne while docked, and an attachment arm to connect said boat to the dock, said attachment arm further comprising connecting means including male and female part cylindrical tracks with one portion of said connecting means being attached to the boat and another portion attached to the dock and with track portions coming into contact when pressure in the air chamber is reduced during docking.

14. The docking system of claim 13 wherein the attachment arm is movable with reference to both the boat and the dock while in contact with both the boat and the dock.

15. The docking system of claim 14 wherein the movable attachment arm further comprises a resiliently biasing member.

16. The docking system of claim 14 wherein said movable attachment arm further comprises a controllable force loading member.

17. The docking system of claim 13 wherein the attachment arm further comprises connecting means including a ball and socket with one portion of said connecting means being attached to the boat and another portion attached to the dock and with ball and socket portions coming into contact when pressure in the air chamber is reduced during docking.

18. The docking system of claim 13 wherein the attachment arm permits relative motion between the boat and the dock.

19. The docking system of claim 18 wherein a movable end of said attachment arm is permanently attached by connecting means including part cylindrical male and female portions.

20. The docking system of claim 13, wherein the floating dock is held in position by dock positioning members that substantially restrict movement of the dock to a vertical direction.

21. The docking system of claim 13 where said attachment arm further comprises a gangplank.

22. The docking system of claim 13 where said dock is substantially U-shaped with the U-shape open to the water.

23. The docking system of claim 13 wherein said air lift boat rises as its air chamber is pressurized thereby disconnecting said attachment arm automatically.

24. A rapid attachment boat docking system comprising:
an air lift boat having an air chamber proximal its underside that raises and lowers said boat while dockside with said air chamber at least partially in water contact during all phases of docking, at least one attachment arm that, when connecting the boat and a dock, is disposed proximal a deck level of the boat, and said attachment arm transmitting only a portion of a weight of the boat to the dock as pressure in said air chamber is reduced, said attachment arm further comprising connecting means including a ball and a socket with one portion of said connecting means being attached to the boat and another portion attached to the dock and with ball and socket portions coming into contact when pressure in the air chamber is reduced during docking.

25. The docking system of claim 24 wherein the attachment arm is movable with reference to both the boat and the dock while in contact with both the boat and the dock.

26. The docking system of claim 25 wherein the movable attachment arm further comprises a resiliently biasing member.

27. The docking system of claim 25 wherein said movable attachment arm further comprises a controllable force loading member.

28. The docking system of claim 24 wherein the attachment arm further comprises connecting means including male and female part cylindrical tracks with one portion of said connecting means being attached to the boat and another portion attached to the dock and with track portions coming into contact when pressure in the air chamber is reduced during docking.

29. The docking system of claim 24 wherein the attachment arm permits relative motion between the boat and the dock.

30. The docking system of claim 29 wherein a movable end of said attachment arm is permanently attached by connecting means including part cylindrical male and female portions.

31. The docking system of claim 24 wherein the dock floats and said dock is lowered in the water as the boat lowers in the water.

32. The docking system of claim 31 wherein the floating dock is held in position by dock positioning members that substantially restrict movement of the dock to a vertical direction.

33. The docking system of claim 24 where said attachment arm further comprises a gangplank.

34. The docking system of claim 24 whrein said dock is substantially U-shaped with the U-shape open to the water.

35. The docking system of claim 24 wherein said air lift boat rises at its air chamber is pressurized thereby disconnecting said attachment arm automatically.

36. A rapid attachment boat docking system comprising:
an air lift boat having an air chamber proximal its underside that raises and lowers said boat while dockside of a floating dock, a portion of said floating dock being open to the water so that the boat can remain partially waterborne while docked, and an attachment arm to connect said boat to the dock, said attachment arm further comprising connecting means including a ball and socket with one portion of said connecting means being attached to the boat and another portion attached to the dock and with ball and socket portions coming into contact when pressure in the air chamber is reduced during docking.

37. The docking system of claim 36 wherein the attachment arm is movable with reference to both the boat and the dock while in contact with both the boat and the dock.

38. The docking system of claim 37 wherein the movable attachment arm further comprises a resiliently biasing member.

39. The docking system of claim 37 wherein said movable attachment arm further comprises a controllable force loading member.

40. The docking system of claim 36 wherein the attachment arm permits relative motion between the boat and the dock.

41. The docking system of claim 40 wherein a movable end of said attachment arm is permanently attached by connecting means including part cylindrical male and female portions.

42. The docking system of claim 36 wherein the floating dock is held in position by dock positioning members that substantially restrict movement of the dock to a vertical direction.

43. The docking system of claim 36 where said attachment arm further comprises a gangplank.

44. The docking system of claim 36 where said dock is substantially U-shaped with the U-shape open to the water.

45. The docking system of claim 36 wherein said air lift boat rises as its air chamber is pressurized thereby disconnecting said attachment arm automatically.

* * * * *